United States Patent [19]

Sullivan et al.

[11] Patent Number: 4,581,187

[45] Date of Patent: Apr. 8, 1986

[54] METHOD OF MANUFACTURING A MOLDED COMPOSITE ELASTOMERIC FOAM SHEET INNERSOLE

[76] Inventors: James B. Sullivan; Richard B. Box, both of 60 Perseverance Way, Hyannis, Mass. 02601.

[21] Appl. No.: 470,638

[22] Filed: Feb. 28, 1983

[51] Int. Cl.⁴ .................. B29C 67/22; B29C 39/10
[52] U.S. Cl. .................... 264/46.4; 249/83; 249/112; 249/121; 264/153; 264/257; 264/338; 425/308; 425/817 R
[58] Field of Search ............. 264/244, DIG. 83, 46.4, 264/153, 338, 257; 249/83, 112, 121; 425/308, 817 R

[56] References Cited

U.S. PATENT DOCUMENTS 3,320,687  5/1967  Leveque .................... 264/244 X
3,954,537  5/1976  Alfter et al. ................ 264/DIG. 83

FOREIGN PATENT DOCUMENTS 769764  11/1971  Belgium ...................... 264/244
51561   12/1980  Japan ......................... 264/244

OTHER PUBLICATIONS

Becker, Walter E., edt., *Reaction Injection Molding*, New York, Van Nostrand Reinhold, ©1979, pp. 56–62, 215–240 and 252–260.

*Primary Examiner*—Philip Anderson
*Attorney, Agent, or Firm*—Richard P. Crowley

[57] ABSTRACT

A shoe-innersole material for use in providing cushioning and support in footwear, and a method of manufacturing the shoe-innersole material, the shoe innersole comprising a heel and an arch section composed of a molded, elastomeric polyurethane foam material of low compression set, the heel and arch sections directly bonded in the molding process to a full-sole material composed either of foam or a solid, flexible sheet material.

22 Claims, 9 Drawing Figures

METHOD OF MANUFACTURING A MOLDED COMPOSITE ELASTOMERIC FOAM SHEET INNERSOLE

BACKGROUND OF THE INVENTION

Shoe innersoles are employed with articles of footwear for a variety of purposes, such as to provide comfort, distribution of weight, arch or heel support and insulating qualities. Innersoles may be employed in athletic, jogging or running shoes and in general footwear and in boots, such as cross-country boots, and in other articles of footwear.

An innersole for an athletic shoe is described, for example, in U.S. Pat. No. 4,187,621, wherein the innersole comprises a laminate of two layers which is cut and conformed in contour to the last shape of the shoe, and which has an upper layer and a lower layer of different and defined compression sets. Typically, both of the upper and lower layers comprise cross-linked, closed-cell polyethylene polymers of different densities. However, it has been found that the polyethylene foam employed in such innersoles is not wholly satisfactory, since the polyethylene foam tends to break down in use, due to the poor compression set of the polyethylene foam, with a considerable reduction in cushioning, particularly in the heel section and the ball section of the foot and may tend to reduce cushioning to unsatisfactory comfort levels. Also, this laminate, while permitting the two-layer foam material to conform to the shape of the wearer's foot, does not provide breathing properties.

Various polymers, including polyurethane foam materials, have been suggested for use in innersoles. For example, U.S. Pat. No. 3,781,231, issued Dec. 25, 1973, describes a resilient, cross-linked, hydrophilic, open-cell, polymer foam material which may be used to cast foams of varying thickness, and the insoles may be cut to shoe-sole shape from sheets of the cast foam. Other shoe innersoles have been prepared having a laminated construction, such as described in U.S. Pat. No. 3,730,169, wherein a laminated, cushion innersole is described as comprisign an upper layer of generally smooth, low-friction material, the bottom layer of a generally resilient material, and an intermediate, permanently deformed cushion layer comprising an open-cell, polyurethane foam material. The innersole requires three separate layers of flat sheet material, with the object being to have the innersole deformed permanently on wearing, to conform the innersole to the shape of the wearer's foot; that is, to prepare a self-shaping innersole. The polyurethane material provides for plastic deformation to conform to the foot shape, while the bottom layer is adhesively secured to form a nonskidding layer.

Other flat-type, multiple-layer, innersole materials are described, for example, in U.S. Pat. No. 4,055,699, which innersole requires a dense, cross-linked polyolefin layer and an aluminum-coated moisture barrier layer, to provide insulation to the foot of the wearer. A protective insert for a shoe is also described in U.S. Pat. No. 3,638,336, wherein a foam closed-cell layer is laminated to a face layer of fabric, with the insert being contoured to conform to the insole of the shoe, and having a sculptured heel portion to cup the heel of the wearer in use. Another insole designed for heat insulation is described in U.K. specification No. 1,243,575, wherein a flexible backing of leather or synthetic plastic material is secured to a heat-insulating layer of expandable polyethylene.

While prior innersoles, for use in articles of footwear, have been satisfactory generally for certains specific purposes, there are disadvantages associated with such innersoles, such as the breaking down of the foam layer with closed-cell, polyethylene-type innersoles, and the problems associated with the cost of laminating, forming and manufacturing the other innersoles. Therefore, there is a need for an improved innersole material and method of manufacture, which provides additional advantages and overcomes at least some of the disadvantages of the prior-art innersoles and methods.

SUMMARY OF THE INVENTION

The invention relates to an improved innersole material and a method of manufacturing shoe innersoles. In particular, the invention concerns an improved innersole for use in articles of footwear which have a molded, polyurethane foam heel and arch section directly bonded to a rigid, lower, last material or to a flexible, foam or solid shoe-upper material.

It has been discovered that molded, contoured, shoe innersole materials of improved structural and design characteristics can be prepared and provide specific cushioning, support and improved innersole structural characteristics, through the use of a molded heel and arch section formed of a substantially nondeformable, open-cell, elastomeric, polyurethane foam material of low and defined compression set, and which elastomeric material is not subject to rapid breakdown and loss of cushioning during use, and which material provides, in the heel and arch sections, cushioning and support for the heel and the arch of the foot of the wearer. Further, it has been discovered that such molded, polyurethane materials of the heel and arch sections may extend to the full-sole shape, rather than only to the heel and arch sections, and further may be bonded directly in the molded process, without the use of other adhesives, to a flexible, shoe-upper material or to a rigid last material or to both materials during the molding process. This method eliminates the cost and difficulties associated with employing various layers of adhesives, laminations or other bonding techniques of the prior art. The molded shoe innersole material of the invention can be molded alone or with a full- or half-sole section, or in combination with numerous flexible and stiff sheet materials, to provide the desired look and feel for the particular purpose for which the innersole material is to be used.

The method of manufacturing the shoe-innersole material provides for an injection-molding of an expandable, reactable, polyurethane foam material which forms a substantially nondeformable, elastomeric foam material heel section, and yet which is directly bonded, during the curing reaction in the mold, to a sheet material which is included within the mold. The elastomeric foam, contoured heel section can be molded also directly to the main structural component of the shoe; that is, to the shoe last material, or, if desired, directly to the shoe-upper material or to both directly in the mold and during the molding process. The improved shoe-innersole material of the invention provides for a unique, integral, bonded innersole and a low-cost and efficient method of preparing the improved innersole material.

The innersole of the invention has a contoured heel and arch section therein, the heel and arch sections composed of a substantially open-cell and nondeformable, elastomeric polyurethane polymer, which polymer is expanded, in situ, in the molding process within a mold cavity, to form the contoured heel and arch section. The elastomeric polymer forms, during the reacting and curing process in the mold, the material which directly bonds to the sheet material employed in the mold. Polyurethane polymers are obtained from the reaction of an isocyanate and a polyol, which reaction typically starts in admixture at room temperature. Polyurethane polymers may comprise a flexible, open-cell-type foam, a rigid foam employed, for example, for insulation, and elastomers. The flexible polyurethane foams are not suitable for the purposes of the invention, since they tend to be soft, flexible and very low-density materials which are subject to deformation during use, while the rigid urethanes are also unsuitable.

The polyurethane polymers employed in the present invention comprise those polyurethane elastomers prepared typically by reaction of methylene diisocyanate or toluene diisocyanate with polyols, which either can be polyethers or polyesters, and preferably polyesters, to prepare a polymeric elastomer having an average molecular weight generally of about 1,000 to 10,000; for example, 4,000 to 8,000. The polyurethane elastomers may be made with various diol extenders and may be cured with a variety of curing agents, such as diamine compounds alone or in various blends. The urethane elastomer uses a curing agent, such that the elastomer cures with time and provides essentially linear cross-linked polymers. The polyurethane elastomeric composition is usually a two-part composition mixed usually just prior to or on injection into the mold cavity, so that all or substantially all of the reaction occurs within the mold cavity after injection. One component comprises the isocyanate and typically the other component comprises a polyol, a curing catalyst, a blowing agent and, if required, cell-control surfactants and various other additives, to improve specific properties of the urethane elastomers; for example, fillers, fibers, ultraviolet-light absorbers, oxidation inhibitors, stabilizers, antioxidants, etc. Microcellular polyurethane elastomers; for example, from about 3 to 30 pounds per cubic foot, such as from 4 to 20 pounds, are typically produced by the reaction of components containing water, halocarbons or azo compounds, so as to form a foamable, elastomeric resin polymer. The reaction typically proceeds in the closed mold with a rise in temperature or an exotherm, and, thereafter, the elastomeric polymer is cured. The formulations of foamable or expandable, elastomeric, cured polyurethane polymers are well known.

A wide variety of sheet materials may be employed as the upper or lower sheet material of the innersole, to include solid, cellular and fabric-type, flat-sheet upper material, depending upon the particular use for the innersole material. For example, various urethane, vinyl and rubber-latex, flat-sheet foam layers may be employed, either alone or having one or both surfaces laminated or adhesively secured or otherwise formed to a knitted or woven fabric layer, such as a cotton, polyester or stretchable fabric material, which forms the upper or lower surface of the flexible sheet material. In addition, the sheet material may comprise a solid, flexible layer, such as one composed of urethane or vinyl sheet material having an imitation-leather, upper-surface appearance, or which may be secured to a fibrous sheet material, such as a woven or knitted fabric. In addition and importantly, in view of the injection process, the innersole material may comprise a flexible, upper sheet material of natural leather, such as of a thin, natural leather having a finished upper surface and a lower rougher surface; for example, a smooth-finished or suede-like surface, either on the upper or lower surface. Of course, man-made imitation-leather materials of various types also may be employed.

The foam materials employed as the upper, flexible sheet material may comprise open-cell-foam-type, flat-sheet layers, typically such as open-cell, rubber-latex-type material or a vinyl-coated fabric, such as Capilair (a product of Uniroyal, Inc.), or other material which is a polymeric-type material which has the ability to absorb moisture and to breathe; thus making the upper sheet material in footwear more comfortable and hygenic. Often such polymeric material contains an interconnecting, open network of microscopic cells or channels, and may extend throughout the depth of the material, with the outer surface of the material being hydrophobic and, thus, water-repellent. Such polymeric materials may include a foam layer and polyester or cotton backings on one or both surfaces thereof. Generally, it is desirable to provide an upper, flexible material having a rough, rather than a smooth, back surface in contact with the expandable, elastomeric polyurethane material, in order to provide improved adhesive strength between the contoured heel section and the upper material.

Another material which may be employed in the process includes a shoe-last material about which the shoe or a particular type of footwear is constructed. Such material includes, but is not limited to, materials known as Texon or Bontex-like materials which are fairly rigid, resin-impregnated, fibrous-type materials. It has been discovered that such materials may be employed in the process and in the contoured innersole of the invention, by placing the material in the mold and injecting the elastomeric polyurethane resin over the material, to bond directly the rigid last material to the lower surface of the contoured, elastomeric, polyurethane foam heel and arch sections. Generally, the last material is employed in the general shape of the foot to be employed on the footwear. Where only a half-heel section is injected, rather than a full-heel section, then the remaining portion of the foot section of the upper surface of the last material is adhesively bonded or otherwise secured to any flexible, upper shoe material. Thus, the contoured innersole of the invention may comprise a lower, rigid, last-type material bonded at the heel portion to the lower-level, flat surface of the foam heel section, with an upper, flexible, soft foam or solid and typically fabric upper material bonded to the upper surface of the heel section and following the contours thereof, and with the forward section of the last material and the upper flexible sheet material directly bonded together through the use of separate adhesives or bonding techniques, to provide a three-, four- or multiple-layer, contoured innersole.

In the method of manufacture, the two-component or multiple-component elastomeric urethane is mixed just prior to or with injection into the mold cavity. An upper, flexible sheet material is laid over the mold cavity, usually after injection and prior to full expanding and full curing of the elastomer, so that the expandable, curable, elastomeric resin expands into close, intimate bonding contact with one surface of the sheet material in the closed mold cavity, and then cures at least partially in the mold.

Generally, where a last material is used, the material is placed in the mold and the urethane is injected over it. Generally, the exotherm is 120° F. or greater and the curing takes place, to provide an expandable, at least partially cured elastomeric polyurethane foam in a time period of from about 1 to 15 minutes, such as from 2 to 12 minutes, with full curing occurring generally during the next 12 to 24 hours, which, of course, may be accelerated by the employment of heat. The elastomeric, cure foam material, comprising the heel or the remaining section, typically has a compressive strength of at least about 15 pounds or greater and has a low compression set, so that it is substantially nondeformable during use by the wearer, such as an ASTM compression set not greater than about 20%; for example, less than 10%. More typically, the cured urethane foam is substantially open-cell in nature, is thermosetting or at least partially cured or fully cured, and has a low foam density; for example, 4 to 20 pounds per cubic foot.

The contoured innersole material of the invention and the process of preparing the same will be described for the purpose of illustration only in connection with certain embodiments; however, it is recognized that various changes, additions and improvements may be made to the illustrated innersole material and process, all without departing from the spirit and scope of the invention.

The method of the invention will be described for the purpose of illustration only, employing an open-molding technique; however, it is recognized that the molded innersoles of the invention can be prepared employing a reaction/injection-molding technique, wherein the reacted elastomeric urethane is injected directly, at a low or high pressure, into a closed mold, either premixed or mixed during the injection process.

DESCRIPTION OF THE EMBODIMENTS

Figure 1:
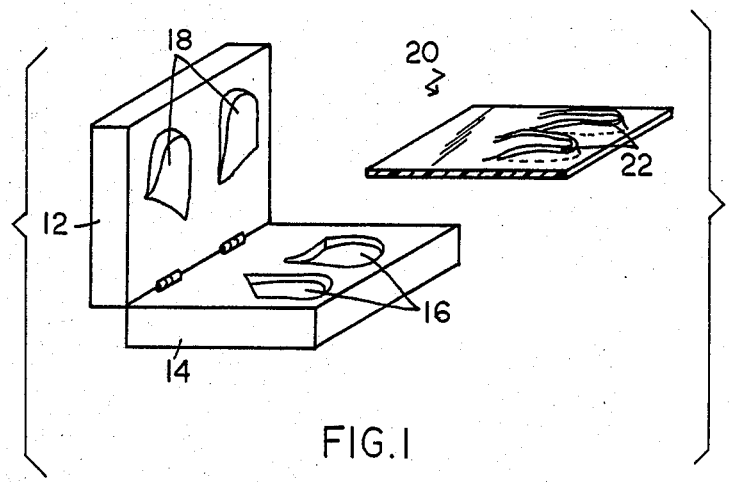
FIGS. 1–3 represent schematic illustrations of the steps of the process of preparing the shoe innersole of the invention.

FIG. 1 shows an injection-molding system 10 comprising an open mold having a male mold section 12 and a female mold section 14, with dual, contoured heel and arch female cavity sections 16 and male contoured section 18, which mold sections form a dual mold cavity of desired size. FIG. 1 shows the employment of a thin, blister-like, rigid, translucent, polypropylene resin sheet insert 20 containing a heel and arch cavity section 22, to match the dual female cavity section 16 in the female mold 14. In use, a mold-release lubricant may be employed in connection with female and male mold cavities 16 and 18; however, it has been discovered that the employment of a thin, female-mating, blister-type polypropylene resin or other olefinic resin insert 20, employed in the female mold 14 to match the female cavity 16, is desirable, since the dual mold section 20 may be removed, together with the dual molded heel and arch section, directly from the open mold cavity. FIG. 1 shows the mold in an open, hinged position, ready for the insertion of the polypropylene resin insert 20.

Figure 2:
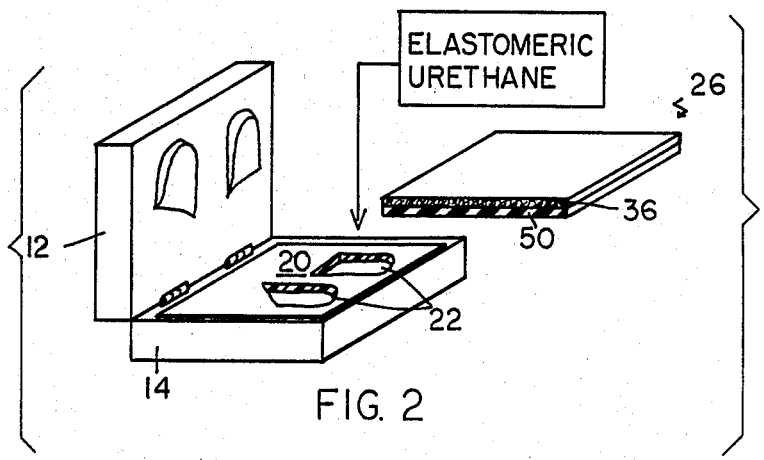

FIG. 2 illustrates the mold sections 12 and 14, with the mold in the open position and with the polypropylene resin insert 20 in position in the female mold section 14. The illustrations as to FIGS. 1 and 2 are to a dual mold cavity; however, it is recognized that single- or multiple-mold cavities may be employed as desired. Further, FIGS. 1 and 2 are directed to a manual-type operation; however, it is recognized that the mold sections 12 and 14 may be placed on a linear conveyer belt or a round table, or otherwise the operations can be formed in a sequential, periodic or continuous manner.

FIG. 2 illustrates the injection of a two-component, premixed, expandable, elastomeric polyurethane polymer 24 directly into each of the female mold cavities 22 of the insert 20. After injection of the expandable urethane, a reaction occurs with the generation of an elastomeric foam, with an exotherm occurring by the reaction of components which are premixed just prior to injection into the mold cavity 16. After injection of the predetermined amount of the polyurethane and prior to the full expanding and curing and generally immediately thereafter, such as from 1 to 15 seconds later, a flat, flexible sheet material 26, to be employed as an upper sheet, is introduced and placed over and on top of the insert 20 and over the cavities 22 containing the reacting polyurethane 24. If desired, the sheet material 26 can be positioned in the female mold cavity 22 prior to the introduction of the foamable polyurethane polymer.

Sheet material 26 comprises, for example, for the purpose of illustration, a fabric top surface 36, typically, for example, a woven cotton or a knitted polyester-type material bonded or secured to a layer of a vinyl open-cell foam or a latex open-cell foam 50. In the process illustrated in FIG. 2, the sheet material generally is greater in size than the female mold cavity 16 and is not yet shaped into a half- or full-foot shape, but rather is used in block form. However, it is recognized that, if desired, the upper flexible sheet material 26 may be employed in the desired foot-shape form. In the process illustrated, the block form material 26 is placed over the insert 20, prior to closing the mold. The flexible sheet material 26, of course, may comprise a thin, solid material, such as from 3 to 50 mils or lower, a foam material; for example, from 5 to 200 mils, or merely a fabric material or any combination thereof. The sheet material 26 selected for use must be capable of being bonded directly to the elastomeric urethane material. If desired, a nonskid fabric material may be employed with the multiple-layer material, with the fabric or nonskid material forming the bottom surface of the sheet material.

Figure 3:
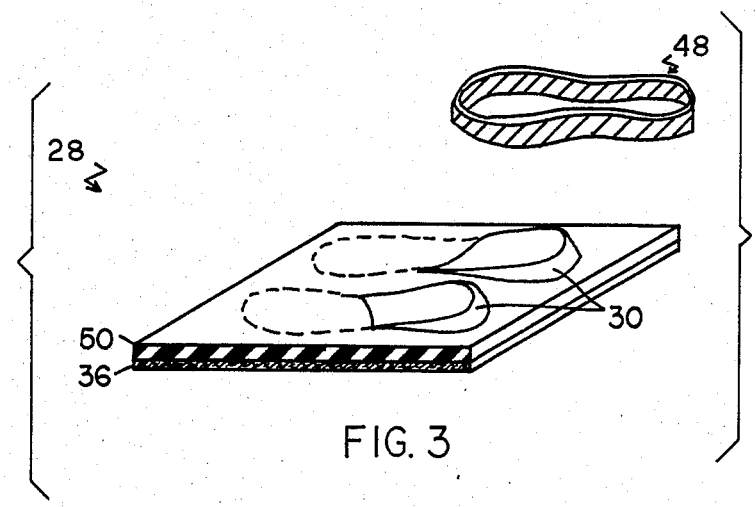

FIG. 3 is a schematic illustration showing a blocker sheet 28 as removed from the mold, containing two, preformed, cured, contoured, molded, elastomeric foam, polyurethane heel and arch sections 30 directly bonded to the bottom foam surface of the sheet material 26. In FIG. 2, the mold is closed, and the injected, elastomeric polyurethane material 24 is allowed to react and to expand directly into contact with the bottom surface of the sheet material 27 and, on curing, to bond directly thereto. The insert 20, with the blocker sheet 28 therein, is removed from the open mold after the molding operation, and the blocker sheet 28 is easily stripped from the insert 20 and the cavities 22, without the need to employ mold-release agents. If desired, curing of the elastomeric urethane may be accelerated by preheating the mold or the surface of the mold, or later by placing the blocker material 28 in an oven to accelerate curing, or retained in storage for 12 to 24 hours to complete curing. After curing of the blocker sheet 28 is completed, then each of the bonded, molded, respective heel and arch sections 30 are removed from the blocker material 28 through a cutting operation, such as the employment of a die cutter 48, to stamp out a shoe innersole having the desired shape and size, with the shoe innersole shown in dotted lines on the blocker sheet 28.

Figure 4:
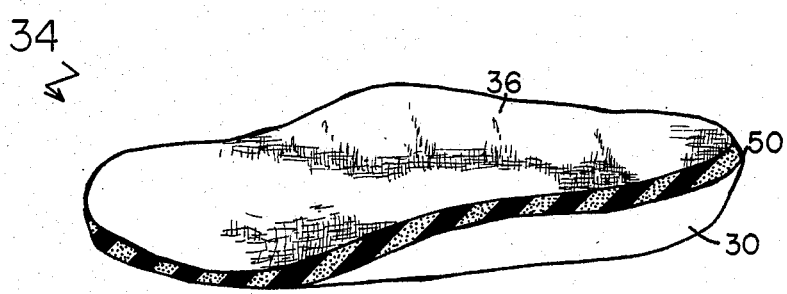
FIG. 4 is a perspective view of a contoured shoe innersole of the invention.
Figure 5:
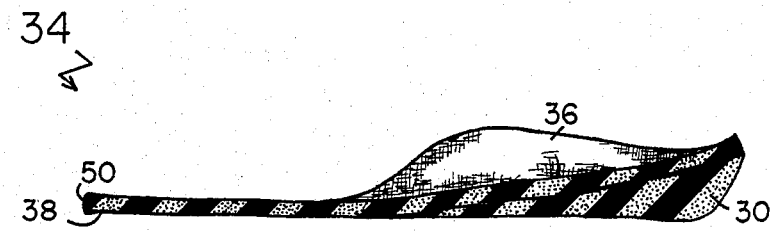
FIG. 5 is a sectional view of the innersole of FIG. 4.

The shoe innersole 34 produced by the process of FIGS. 1-3 is illustrated in FIGS. 4 and 5. The innersole 34 has an upper, woven fabric surface 36 which is contoured in shape to the upper portion of the heel, with the heel section 30 formed of a cured, nondeformable, urethane elastomeric foam material of about 8 to 12 pcf density and generally having a flat, bottom, one-half section and another smooth skin layer.

FIG. 5 is a one-half sectional view of the innersole 34 of FIG. 4, which shows the bottom surface 38 formed of the foam layer 50, and showing the urethane heel and arch sections contoured just generally under the arch, to meet in a gradual, tapered manner the flat bottom surface of the foam section 38.

Figure 6:
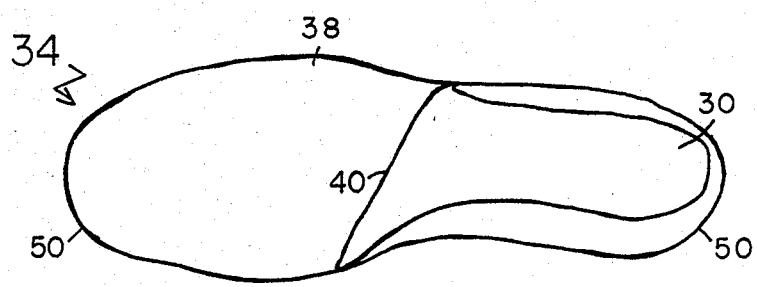
FIG. 6 is a bottom plan view of the innersole material of FIG. 4.

FIG. 6 is a bottom plan view of the innersole 34, showing the flat bottom surface 38 and urethane elastomeric heel and arch sections and showing a diagonal-shaped, tapered line 40 of the heel and arch sections gradually contoured and extending from one to the other side of the forward part of the arch of the foot, with the elastomeric urethane foam formed under the arch of the foot, the generally uniform foam layer 50 extending around the entire peripheral portion of the heel and under the arch of the foot, to provide arch support and comfort, with the line of demarcation between the flexible, lower, foam layer of the sheet material 50 and the polyurethane foam of the heel section 30 as illustrated by line 40.

Figure 7:
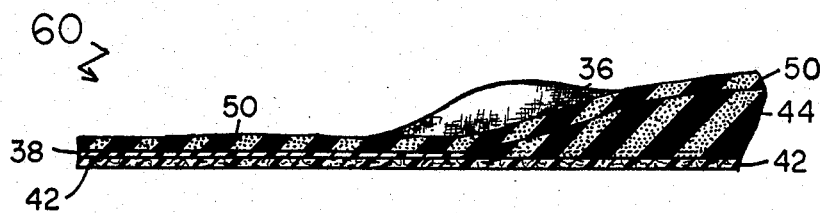
FIG. 7 is a sectional, illustrative view of another shoe innersole of the invention.

FIG. 7 is a sectional view of a modified shoe innersole 60, wherein a rigid last material is also employed; thus forming a shoe innersole having a rigid last material 42 forming the bottom of the innersole, the last material 42 shaped in the form of a full foot and inserted into the female mold cavity 16, prior to the injection into the mold of the polyurethane elastomer 24. The innersole includes a molded heel section 44 directly bonded to an upper, flexible material 50 formed of a flexible, thin layer of open-cell foam having a fabric surface 36. The upper surface of the last material 42 and the lower surface of the foam material 50 are bonded by a thin adhesive layer 58, such as a urethane or other adhesive, forward of the urethane foam arch and heel sections 44, to form a composite innersole material having an integral last material, both bonded to the urethane foam material 50.

Figure 8:
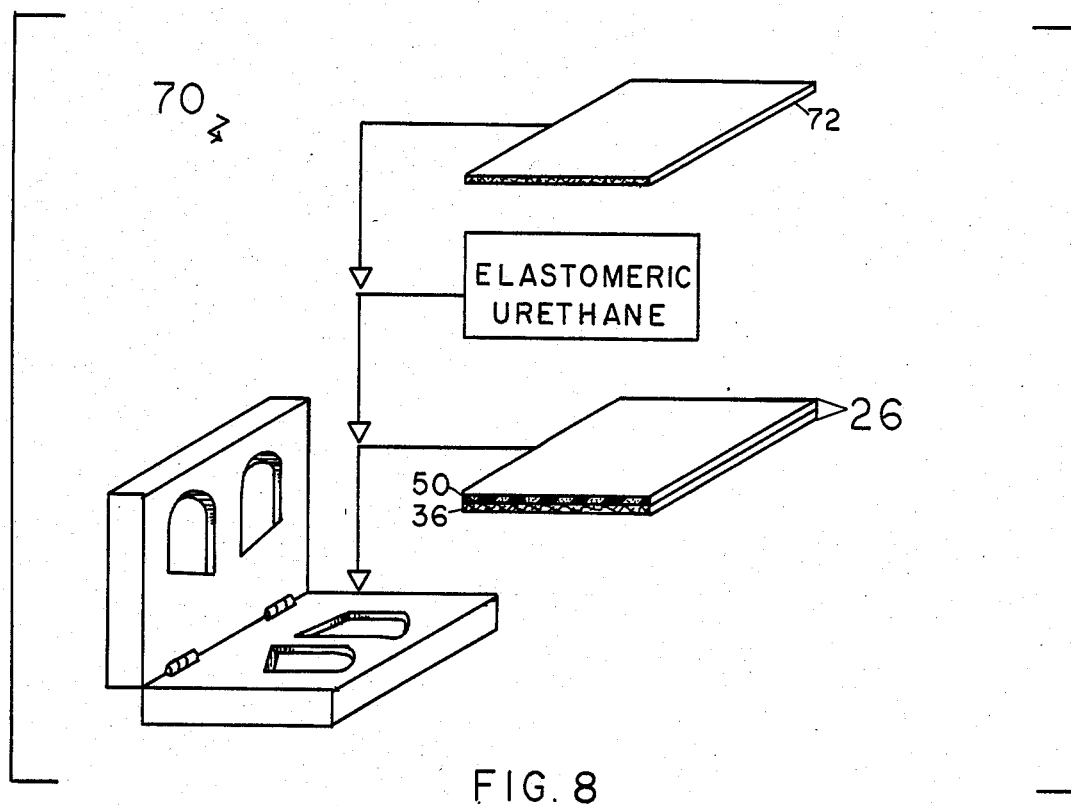
FIGS. 8 and 9 represent schematic illustrations of the steps of preparing a multilayer molded shoe innersole of the invention.
Figure 9:
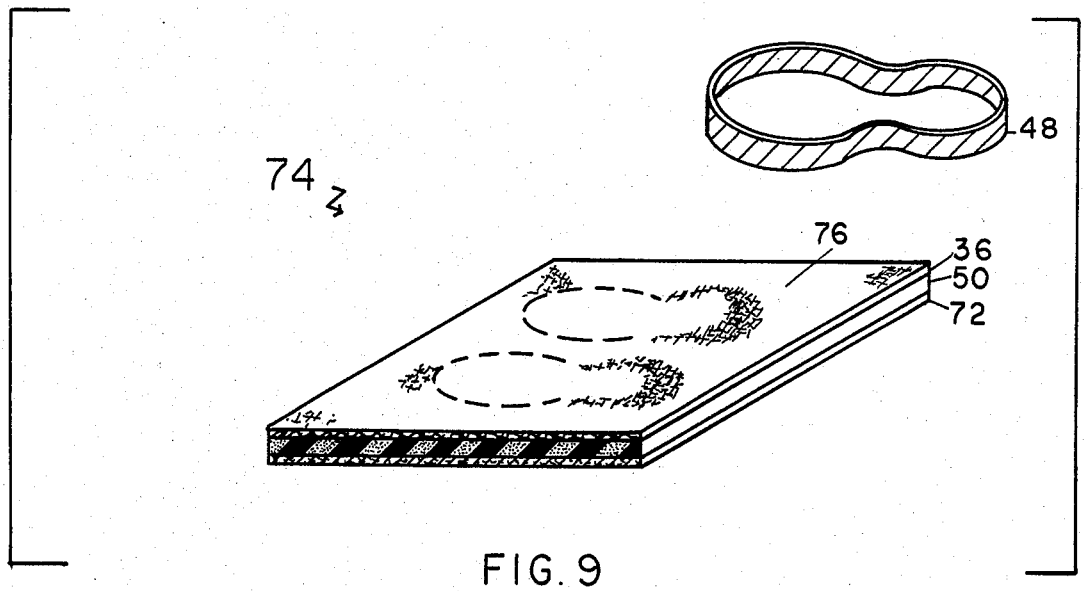

FIGS. 8 and 9 represent a further process 70 for preparing a shoe innersole as shown in FIG. 7 or wherein two innersole sheet materials are used to provide a molded full sole shoe innersole having lower last material and an upper open-cell foam material. The process 70 employs the mold as illustrated in FIG. 1, except the resin insert 20 need not be used. FIG. 8 shows the mold in the open position with a flexible innersole sheet material 26 composed of an open-cell foam layer 50 and a fabric layer 36 ready to be placed in the female mold cavity 16. Elastomeric urethane is shown as introduced on top of the innersole sheet material 50, while a still shoe last material 72 is placed on top of the introduced elastomeric urethane prior to placing the mold in the closed-mold position to permit the elastomeric urethane to expand and react into contact with the opposing surface of the shoe last innersole material 72 and the flexible innersole material 26. FIG. 9 illustrates the multiple layer blocker sheet 74 containing the expanded, reacted molded elastomeric polyurethane material.

As illustrated, the shoe innersole of the invention has generally contoured, elastomeric urethane, foamed, one-half heel and arch sections. However, it is recognized that the polyurethane resin may be injection-molded into a complete shape of a foot, with the elastomeric urethane foam extending not only to contoured heel and arch sections, but also to and including a generally flat, uniform foam layer in the shape of a foot, if desired, to take the place of foam layer 50.

The method of preparing the innersole of the invention has been illustrated employing an elastomeric urethane mixed outside of the mold and injected after mixing into the open mold. Thus, there is provided a unique, inexpensive, improved, molded innersole material suitable for use in articles of footwear for comfort, heat insulation, heel support and, if required, as a component of the shoe, where a last material is employed.

What is claimed is:

1. A method for manufacturing a molded shoe innersole, which innersole comprises a contoured heel and arch section composed of a substantially open-cell, elastomeric polyurethane foam material directly bonded to an innersole sheet material and which method comprises:
    (a) providing a mold composed of a male section having a male element and a female section having a female cavity, the mold sections adapted to be placed in an open and a closed mold position, which mold in the closed mold position defines a contoured heel and arch mold cavity;
    (b) placing the mold in an open mold position and introducing into the female cavity an expandable, reactable elastomeric polyurethane material to form the heel and arch section of the innersole;
    (c) introducing between the male and female mold sections while the mold is in the open position an innersole sheet material, the inner sole sheet material introduced prior to introducing the expandable, reactable elastomeric polyurethane material or immediately after introducing the expandable, reactable elastomeric polyurethane material;
    (d) placing the mold in a closed mold position to permit the introduced polyurethane material to expand and react within the mold cavity into contact with the innersole sheet material, so as to provide a blocker sheet composed of a reacted, expanded foam elastomeric polyurethane heel and arch section directly bonded to the introduced innersole sheet material;
    (e) placing the mold in an open mold position and removing the blocker sheet; and
    (f) optionally, cutting the blocker sheet to provide a molded shoe innersole for footwear.

2. The method of claim 1 wherein the expanded, reacted elastomeric polyurethane material has a foam density ranging from about 4 to 20 pounds per cubic foot.

3. The method of claim 1 wherein the expanded, reacted elastomeric foam polyurethane material has a compressive strength of about 15 psi or greater.

4. The method of claim 1 wherein the expanded, reacted, foam elastomeric polyurethane material has an ASTM compression set of not greater than about 20 percent.

5. The method of claim 1 which includes premixing the components of the reactable and expandable elastomeric polyurethane material just prior to introducing the expandable, reactable polyurethane material into the female cavity, and which elastomeric polyurethane material provides a reaction exotherm to a temperature of about 120° F. or more.

6. The method of claim 1 which includes expanding and reacting the polyurethane material in the closed mold for a period of from 1 to 15 minutes and removing the blocker sheet from the open mold position and completing the cure of the polyurethane material.

7. The method of claim 1 wherein the innersole sheet material comprises a flat, flexible sheet innersole material.

8. The method of claim 1 wherein the innersole sheet material comprises an open-cell, foam sheet material having a fabric layer secured to at least one surface thereof, which fabric layer forms the upper surface of the molded shoe innersole.

9. The method of claim 8 wherein the open-cell innersole sheet material comprises a urethane, vinyl or rubber latex-type foam sheet material.

10. The method of claim 1 wherein the innersole sheet material comprises a vinyl, urethane or natural leather innersole sheet material.

11. The method of claim 1 wherein the innersole sheet material comprises a shoe last material wherein the shoe last material is bonded directly to the lower surface of the molded shoe innersole.

12. The method of claim 1 which includes trimming the blocker sheet by die-cutting the blocker sheet to the general shape and size of a shoe innersole for use in footwear.

13. The method of claim 12 wherein the innersole sheet material comprises a fibrous resin impregnated flat footwear last material.

14. The method of claim 1 which includes:
(a) placing a thin, preformed resin liner having a female cavity contoured approximately the shape of the female mold cavity of the mold over the female mold cavity, the resin liner material not adhereable to the elastomeric polyurethane material to be introduced;
(b) introducing the elastomeric polyurethane material into the female mold contour of the resin liner;
(c) placing a shoe innersole material on top of the introduced elastomeric polyurethane material prior to placing the mold in a closed position;
(d) removing the resin liner material with the blocker sheet therein; and
(e) stripping the blocker sheet with the molded urethane heel and arch sections from the resin liner.

15. The method of claim 14 wherein the resin liner material is composed of a rigid polyethylene or polypropylene resin material.

16. The method of claim 1 which method includes:

(a) introducing a first innersole sheet material between the mold sections in the open mold position;
(b) introducing an expandable, reactable elastomeric polyurethane material into the female mold cavity and onto the first innersole sheet material;
(c) introducing a second innersole sheet material onto the introduced polyurethane material; and
(d) placing the mold in a closed mold position to permit the polyurethane material to expand and react to provide a molded foam elastomeric polyurethane heel and arch section directly bonded to the opposing surfaces of the first and second innersole sheet materials.

17. The method of claim 16 wherein the first or second innersole sheet material comprises a shoe last material to form the bottom surface of the molded innersole and the other innersole sheet material comprises a flexible innersole sheet material to form the upper surface of the molded shoe innersole.

18. The method of claim 16 wherein the first or second innersole sheet material comprises an open cell foam sheet material having a fabric-type surface to form the upper surface of the molded shoe innersole.

19. The method of claim 1 which comprises cutting a molded shoe innersole from the blocker sheet, which shoe innersole has a full sole shape.

20. A method of manufacturing a molded shoe innersole, which innersole comprises a contoured heel and arch section composed of a substantially open-cell foam elastomeric polyurethane material directly bonded to an innersole sheet material and which method comprises:
(a) providing a mold composed of a male section having a male element and a female section having a female cavity, the sections adapted to be placed in an open and in a closed mold position, which mold in the closed position defines therein a contoured heel and arch mold cavity;
(b) placing the mold in an open mold position and introducing into the female cavity an expandable, reactable, elastomeric polyurethane material to form the desired heel and arch section of the innersole;
(c) introducing into the mold in the open position a flat, flexible innersole sheet material, the innersole sheet material introduced immediately after the introduction of the expandable, reactable elastomeric polyurethane material;
(d) immediately closing the mold sections to place the mold in a closed position to permit the introduced polyurethane material to react and expand in the mold cavity into contact with the innersole sheet material to provide a blocker sheet composed of a polyurethane foam heel and arch section directly bonded to the innersole sheet material;
(e) opening the mold and removing the blocker sheet; and
(f) cutting the blocker sheet to provide a molded shoe innersole.

21. The method of claim 20 which includes:
(a) inserting into the female mold cavity while the mold is in the open position a thin, preformed resin liner having a contoured female cavity approximately that of the female mold cavity;
(b) introducing the expandable, reactable elastomeric polyurethane foam material into the female cavity of the resin liner;
(c) removing the resin liner and the blocker sheet from the mold in the open position; and (d) stripping the blocker sheet from the resin liner.

22. The method of claim 20 wherein the flat, flexible innersole sheet material comprises an open-cell foam innersole sheet material having a fabric surface, which fabric surface forms the upper surface of the molded shoe innersole and which includes placing the shoe innersole sheet material with the open cell foam over the expandable, reactable elastomeric polyurethane material to provide a direct bonding between the expanded, reacted foam elastomeric polyurethane material and the open-cell foam shoe innersole sheet material.

* * * * *